US008868295B2

(12) United States Patent
Jeong

(10) Patent No.: US 8,868,295 B2
(45) Date of Patent: Oct. 21, 2014

(54) MOVEMENT INPUT APPARATUS APPLIED TO STEERING APPARATUS AND MOBILE CONTROL SYSTEM USING THE SAME

(75) Inventor: Ji Wook Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 384 days.

(21) Appl. No.: 12/949,569

(22) Filed: Nov. 18, 2010

(65) Prior Publication Data

US 2011/0153163 A1 Jun. 23, 2011

(30) Foreign Application Priority Data

Dec. 18, 2009 (KR) ......................... 10-2009-0127488
Jun. 7, 2010 (KR) ......................... 10-2010-0053242

(51) Int. Cl.
 *B62D 1/06* (2006.01)
 *G08B 21/06* (2006.01)
 *B62D 1/04* (2006.01)
 *B60W 50/16* (2012.01)

(52) U.S. Cl.
 CPC .............. *B62D 1/046* (2013.01); *G08B 21/06* (2013.01); *B60W 50/16* (2013.01); *B62D 1/06* (2013.01)
 USPC ........................................... 701/41; 180/272

(58) Field of Classification Search
 USPC ........................................................ 701/42
 See application file for complete search history.

(56) References Cited

U.S. PATENT DOCUMENTS

| | | | |
|---|---|---|---|
| 4,492,952 A * | 1/1985 | Miller ........................... | 340/439 |
| 6,218,947 B1 * | 4/2001 | Sutherland .................... | 340/576 |
| 6,239,707 B1 * | 5/2001 | Park .............................. | 340/576 |
| 6,731,925 B2 * | 5/2004 | Naboulsi ....................... | 455/345 |
| 7,663,495 B2 * | 2/2010 | Haque et al. .................. | 340/576 |
| 2003/0096594 A1 * | 5/2003 | Naboulsi ....................... | 455/411 |
| 2004/0209594 A1 * | 10/2004 | Naboulsi .................... | 455/404.1 |
| 2006/0107762 A1 | 5/2006 | Sandbach et al. | |
| 2007/0008083 A1 | 1/2007 | Berg et al. | |
| 2007/0062753 A1 * | 3/2007 | Yoshida et al. .............. | 180/333 |
| 2007/0100523 A1 * | 5/2007 | Trachte ......................... | 701/41 |
| 2008/0071177 A1 * | 3/2008 | Yanagidaira et al. ......... | 600/483 |
| 2008/0143504 A1 * | 6/2008 | Martin Alvarez ............ | 340/439 |
| 2009/0096764 A1 * | 4/2009 | You .............................. | 345/174 |
| 2009/0096766 A1 * | 4/2009 | Liu ............................... | 345/174 |
| 2011/0043350 A1 * | 2/2011 | Ben David .................... | 340/441 |

FOREIGN PATENT DOCUMENTS

| | | | |
|---|---|---|---|
| JP | 04-306171 A | | 10/1992 |
| JP | 07-010024 A | | 1/1995 |
| JP | 2007-76491 A | | 3/2007 |
| JP | 2009-045077 A | | 3/2009 |
| JP | 2009045077 A | * | 3/2009 |
| JP | 2009-248599 A | | 10/2009 |
| KR | 1020070028745 A | | 3/2007 |
| WO | WO 03/012557 A2 | | 2/2003 |

* cited by examiner

*Primary Examiner* — Shelly Chen

(57) ABSTRACT

There is provided a movement input apparatus applied to a steering apparatus and a mobile control system using the same. In detail, the steering apparatus performing steering or adjusting functions includes: a movement input apparatus including a signal detector that is attached or embedded in a surface of a steering apparatus and uses a resistive conductive yarn to detect finger contact signals; an estimator that receives the finger contact signals detected in the signal detector to estimate a status of an operator; and a display unit that converts and displays the estimated movement of the operator into signals of a type able to be sensed by a user; an extractor that analyzes the status information transmitted from the transmitter to extract the operational signals of the user; a controller that generates and transmits control signals for external devices according to the extracted operational signals of the user.

16 Claims, 6 Drawing Sheets

TYPE EMBEDDED IN STEERING WHEEL

STEERING WHEEL COVER TYPE

DISPOSABLE ATTACHMENTS TYPE

MOVEMENT INPUT APPARATUS APPLIED TO STEERING APPARATUS AND MOBILE CONTROL SYSTEM USING THE SAME

CROSS-REFERENCE TO RELATED APPLICATIONS

This application claims the priorities of Korean Patent Application Nos. 10-2009-0127488 filed on Dec. 18, 2009 and 10-2010-0053242 filed on Jun. 7, 2010, in the Korean Intellectual Property Office, the disclosures of which are incorporated herein by reference.

BACKGROUND OF THE INVENTION

1. Field of the Invention

The present invention relates to a movement input apparatus applied to a steering apparatus and a mobile control system using the same, and more particularly, to an apparatus and a system connected to a steering apparatus to receive a driver's movement and output signals for controlling a car.

2. Description of the Related Art

A steering apparatus, or a steering wheel, has been commonly used in various apparatuses or pieces of equipment in which directional operations should be performed.

However, when the steering wheel of a high-speed mobile apparatus such as a car, or the like, must be operated for a long period of time, a driving condition requiring a high degree of concentration is prolonged, such that driver fatigue is rapidly accumulated. Therefore, unexpected situations occur, such as drowsiness damaging concentration, such that there is an increased likelihood that a driver will incorrectly perform a steering operation, being directly connected to a risk to a driver's life. Therefore, many emergency functions for maintaining driver concentration have been studied.

In particular, development projects have been largely focused on convenience devices and warning devices, or the like, in a car, in order to prevent driver drowsiness. The existing development projects have mainly been interested in visually observing the driver. In particular, attempts to monitor a driver's drowsiness status by observing the movement of driver's eyes, or the like, or monitor a driver's drowsiness status by directly collecting bio-potential signals such as a driver's electrocardiogram collected in an electrode mounted on a steering wheel, or the like, and analyzing them have been made.

SUMMARY OF THE INVENTION

An aspect of the present invention provides a movement input apparatus applied to a steering apparatus and a mobile control system using the same. In particular, the present invention provides an apparatus and a system using the same that obtains information on operator movement using the movement input apparatus applied to the steering apparatus and outputs signals for controlling a car using the obtained movement information.

According to an aspect of the present invention, there is provided a movement input apparatus, including: a detector that is attached or embedded in a surface of a steering apparatus to detect finger contact movement; an estimator that receives information on the finger contact movement detected in the detector to estimate a movement pattern analysis and status of an operator; and a display unit that converts and displays the analyzed movement patterns of the operator and the estimated status of the operator into signals of a type able to be sensed by a user.

According to another aspect of the present invention, there is provided a mobile control system, including: a movement input apparatus including a detector that is attached or embedded in a surface of a steering apparatus to detect finger contact movement, an estimator that receives information on the finger contact movement detected in the detector to estimate a movement pattern analysis and status of an operator, and a display unit that converts and displays the analyzed movement patterns of the operator and the estimated status of the operator into signals of a type able to be sensed by a user; and a control device including an extractor that extracts operator operation signals by analyzing at least one of information on the finger contact movement detected in the detector transmitted from the movement input apparatus, information on operator movement patterns analyzed in the estimator, and operator status information estimated in the estimator and a controller that generates and transmits control signals for external devices according to the extracted operational signals of the operator.

DETAILED DESCRIPTION OF THE PREFERRED EMBODIMENT

Figure 1:
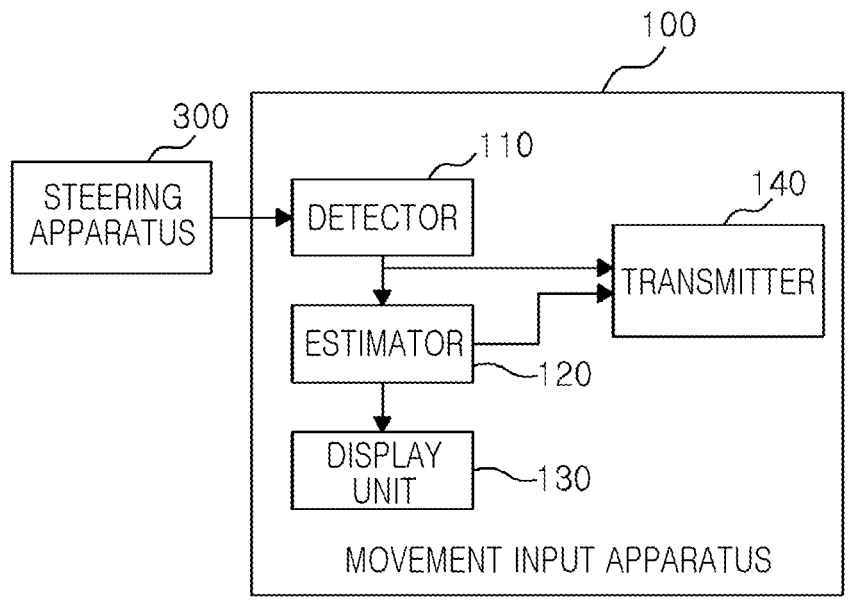
FIG. 1 is a functional block diagram of a movement input apparatus of the present invention.

Hereinafter, exemplary embodiments will be described in detail with reference to the accompanying drawings so that they can be easily practiced by those skilled in the art to which the present invention pertains. However, in describing the exemplary embodiments of the present invention, detailed descriptions of well-known functions or constructions are omitted so as not to obscure the description of the present invention with unnecessary detail.

In order to elucidate the present invention, the description of parts independent from the present invention will be omitted. Like components are denoted by like reference numerals throughout the specification.

Unless explicitly described to the contrary, the word "comprise" and variations such as "comprises" or "comprising," will be understood to imply the inclusion of stated elements but not the exclusion of any other elements Due to the use of a haptic technology, or the like, the deformation of a surface of a steering apparatus is monitored in real time within a limited range of the surface of the steering apparatus, thereby making it possible to estimate an operator's operational status or predict an operator's drowsiness status. If it is determined that the operator is in a drowsy state, or the like, haptic signals are output by a power generator, such as a motor embedded in the surface of the steering apparatus, or the like. At this time, the operator senses the haptic signals through finger contact and receives a warning, such that drowsiness can be preemptively prevented.

In order to operate a handsfree cell phone device, a music player, or the like, that is being used by being mounted on the steering wheel, the desired operations, such as rubbing, pressing, or pulling, can be performed by using the movement input apparatus to which the haptic technology is applied.

The above-mentioned methods can offer convenience of operation for an operator by receiving information while using buttons, or the like, mounted on the existing steering apparatus.

Meanwhile, the haptic functions of the steering apparatus may be embedded in the surface of the steering apparatus as well as applied to a steering wheel cover, or the like, by being manufactured in a film type made of various materials such as vinyl that has elasticity and restoring force.

In order to sense the deformation of the surface of the steering apparatus due to the finger contact therewith and output it as signals, a conductive yarn or a line or a stripe made of materials having the same conductivity can be weaved, buried, or attached into the steering wheel cover. In addition, the above-mentioned steering apparatus is not limited to only a use of a car and may be applied to any steering apparatus of a steering wheel type. In particular, the above-mentioned steering apparatus can be used to guarantee the safety of the user operating the steering apparatus of the steering wheel type that should be precisely operated for a long period of time.

The movement input apparatus using the conductive yarn can be easily combined with the existing steering wheel parts, easily convert the physical change of the attached portion into electric signals due to the relatively excellent electrical characteristics thereof by using the conductive yarn, and generate input signals for control by using the converted electric signals to more actively use the control devices for a car, and so on, during daily life.

FIG. 1 is a functional block diagram of an apparatus of movement input of the present invention.

Referring to FIG. 1, the movement input apparatus 100 according to the present invention may be configured to include a detector 110, an estimator 120, and a display unit 130 in a system of using a steering apparatus 300 and may further include a transmitter 140.

The steering apparatus 300 is a steering or adjusting apparatus, or the like, for a car, or the like. Generally, the steering apparatus 300 is configured as a steering wheel.

The detector 110 detects the operator's finger contact movement. The detector 110 may be configured to include the resistive conductive yarn in order to detect the operator's finger contact movement contacting the steering apparatus 300. The configuration of detecting the finger contact movement such as the resistive conductive yarn may be configured to be attached or embedded in the surface of the steering apparatus 300. Components converting the movement information detected in the resistive conductive yarn, or the like, into electric signals that can be electronically processed may be further provided.

Figure 2:
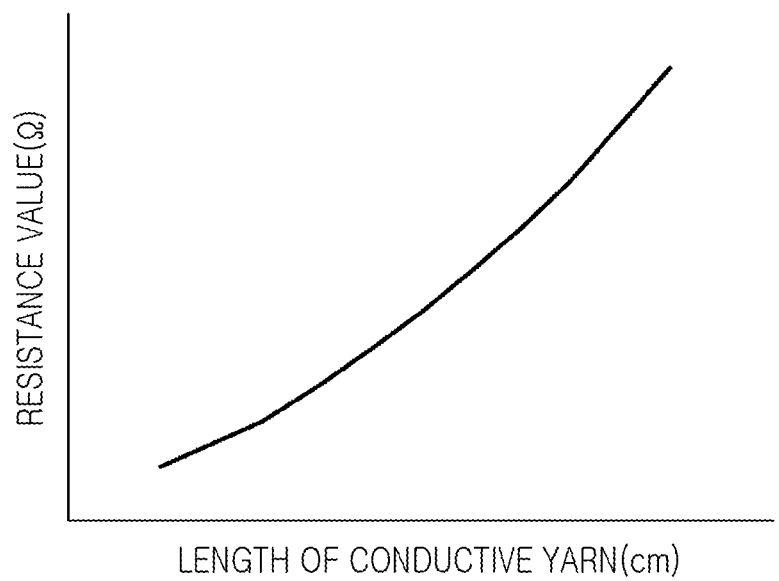
FIG. 2 is a graph of showing the characteristics of a resistive conductive yarn included in a detector of the present invention.

Referring to FIG. 2, the resistive conductive yarn has a period of linearly changing the length of the conductive yarn and the resistance value of the conductive yarn. Therefore, the expansion and contraction of the length of the conductive yarn due to the operator's finger contact movement can be detected by electrical signals.

When the conductive yarn configuring the detector 110 will be configured to have several conductive yarns, the finger contact movement can be detected by each area of the conductive yarns.

The estimator 120 estimates the movement and status of the operator by using the information on the movement of the operator detected in the detector 110.

The movement and status can be estimated by a method that matches the movement information patterns to the detected movement and operator status by using behavior analysis or statistical analysis, and the like.

The movement input apparatus may further include a transducer that AD-converts the detected operator movement information that is analog signals, in order to perform digital signal processing on the information.

The display unit 130 converts the estimated movement of the operator into signals that can be sensed by the user and displays it. As the signals that can be sensed by the user, there are image signals, voice signals, sound signals, or vibration signals, and so on. In the case of visual signals, the converted signals are displayed on the screen, while in the case of acoustic signals, they are displayed by using a speaker, or the like.

The transmitter 140 transmits movement information detected in the detector 110 and/or the status information of the operator estimated in the estimator 120 to the external devices. The information can be transmitted by a wired or wireless communication method. As communication standards usable for the wired or wireless communications, there are serial communication, Bluetooth communication, Zigbee communication, mobile communication, and so on.

Figure 3:
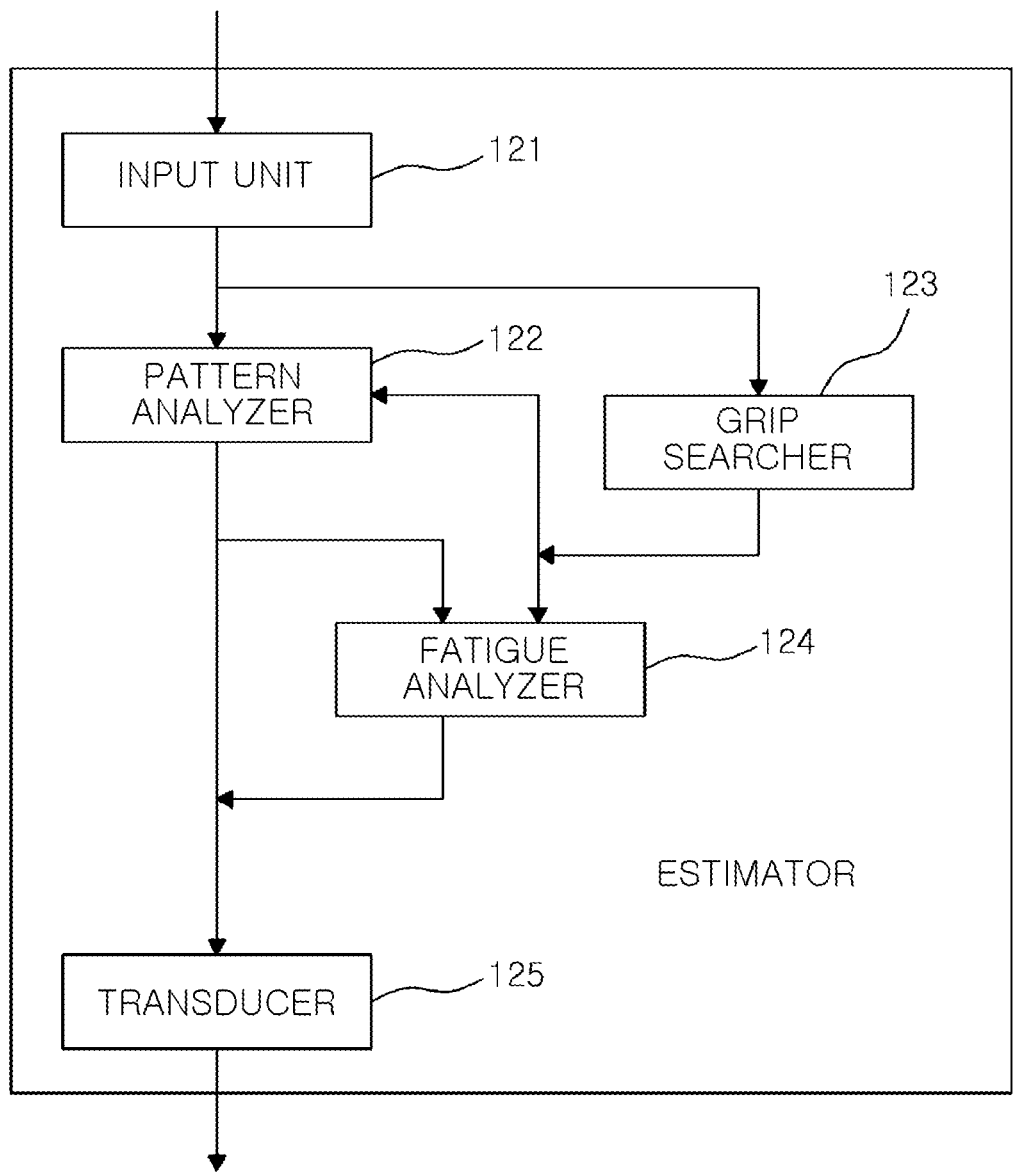
FIG. 3 is a block diagram showing a functional block of an estimator according to an exemplary embodiment of the present invention.

FIG. 3 is a block diagram showing a functional block of an estimator according to an exemplary embodiment of the present invention.

Referring to FIG. 3, the estimator 120 according to the present invention may be configured to include an input unit 121, a pattern analyzer 122, a grip searcher 123, and a fatigue analyzer 124 and may further include the transducer 125.

The input unit 121 filters the change pattern in resistance value or voltage value in the conductive yarn by using the input electric signals.

The pattern analyzer 122 analyzes the change pattern in resistance value or voltage value filtered in the input unit and converts it into operator movement patterns, thereby determining whether the operator movement patterns are normal patterns or abnormal patterns. The operator movement patterns are formed as movement information, which is in turn transmitted to the display unit 130 and the transmitter 140.

The grip searcher 123 searches the steering wheel portion gripped by the operator when the change in filtered resistance value or voltage value is of a specific value or more in order to increase the accuracy of the pattern analysis of the pattern analyzer 122 and the fatigue analyzer 124.

For example, since the movement patterns are abnormally changed under the situations such as driving while drowsy, the impossibility of the adjustment of the steering wheel, and the like, the change value exceeds a specific value. Then, the grip searcher 123 senses the exceeded change value to determine the grip or not and the locations of grip. When the user does not maintain the grip, and the like, it can inform of the user of the situation through the display unit 130.

The grasped information is transmitted to the fatigue analyzer 124 and the pattern analyzer 122. Therefore, it is preferable that the pattern analyzer 122 further refers to the information transmitted from the grip searcher to analyze the movement patterns.

The fatigue analyzer 124 uses the movement patterns analyzed in the pattern analyzer and the information grasped in the grip searcher to analyze the operator's fatigue level and operator's status. The analyzed operator fatigue level is transmitted to the display unit 130 and the transmitter 140. The display unit 130 may provide the analyzed operator fatigue information to the user.

Further, in order to convert the movement information of the pattern analyzer 122 and the operator fatigue information and operator status information from the fatigue analyzer 124 into digital signals and then transmit them to the display unit 130 and the transmitter 140, the transducer A/D-converts the signals.

Figure 4A:
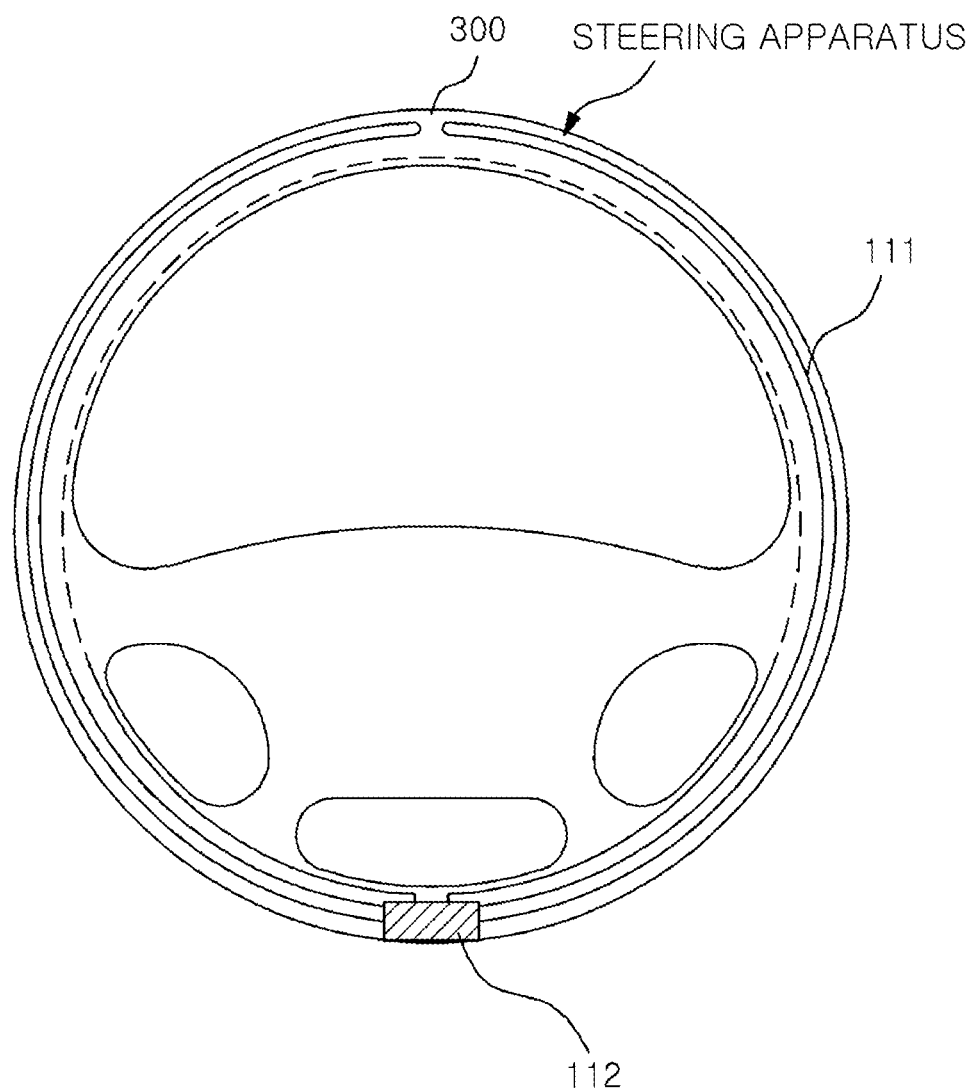
FIGS. 4A and 4B are diagrams showing an example of implementing a steering apparatus and a detector according to an exemplary embodiment of the present invention.
Figure 4B:
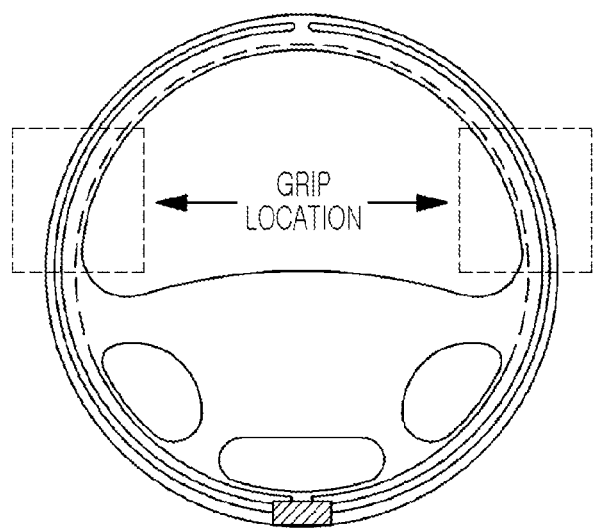
Figure 4B:
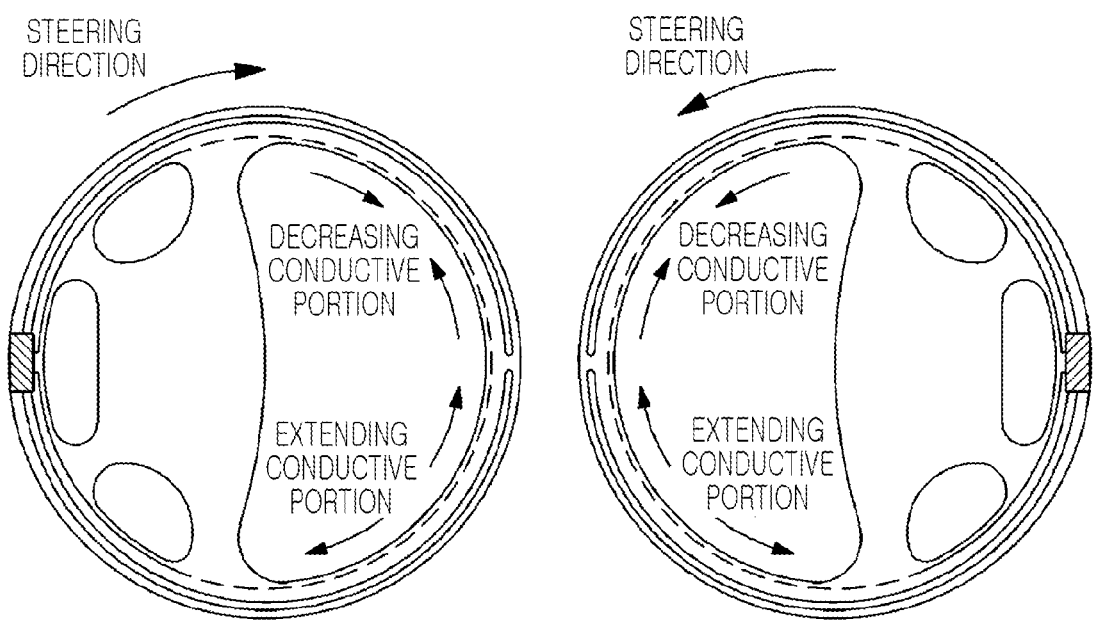

FIGS. 4A and 4B are diagrams showing an example of implementing a steering apparatus and a detector according to an exemplary embodiment of the present invention.

Referring to FIG. 4A, the detector 110 of the present invention may be configured to include conductive yarn 111 and a signal processor 112.

The conductive yarn 111 may be implemented as conductive yarn and has characteristics as shown in FIG. 2. The conductive yarn may be implemented to be attached to the steering apparatus 300.

The operator operates the steering apparatus 300 when he/she operates equipment such as a car by using the steering apparatus 300. In this case, the length of the conductive yarn 111 attached to the steering apparatus 300 is changed and the movement of the operator can be provided by using the change.

For example, referring to FIG. 4B, when the operator operates the steering apparatus 300, he/she can input his/her movement information through operations such as griping certain portions of the steering apparatus 300 and then pulling or pushing it clockwise or counter-clockwise.

Further, the operator operates the steering apparatus 300 by other methods, thereby making it possible to perform an operation of auxiliary functions other than the steering function.

For example, an input is made to perform functions other than the steering function through an operation of twisting the steering wheel.

Figure 5A:
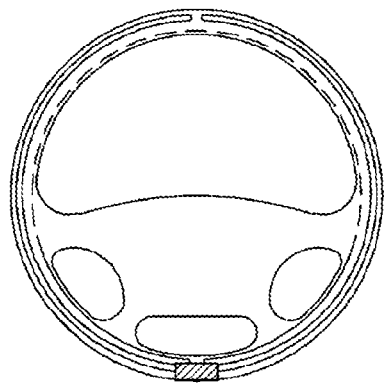
FIGS. 5A, 5B and 5C are diagrams showing examples of implementing a movement input apparatus according to the present invention.
Figure 5B:
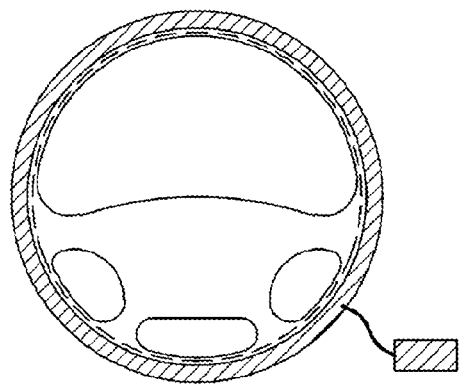
Figure 5C:
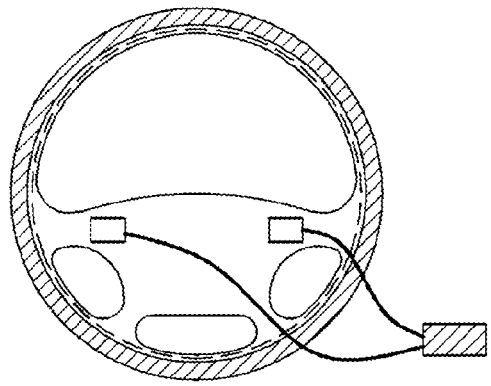

FIGS. 5A, 5B and 5C are diagrams showing examples of implementing a movement input apparatus according to the present invention.

As shown in FIG. 5A, the movement input apparatus may be implemented so that only the steering apparatus 300 and detector 110 are exposed to the outside and the estimator 120 and the transmitter 140 is embedded in the steering apparatus 300. Although not shown, the display unit 130 may be embedded in the steering apparatus 300 or may be disposed to receive and display the signals from the outside.

As shown in FIG. 5B, the detector 110 may be implemented as a cover type attached to the steering apparatus 300 and the estimator 120, the display unit 130, and the transmitter 140 may be implemented as an external device connected to the detector 110.

As shown in FIG. 5C, the detector 110 may be implemented as a type of disposable attachment.

Information can be transmitted between the detector 110 and the estimator 120 or the transmitter 140 in the wired or wireless communication method. In addition, information can be transmitted between the estimator 120 and the display unit 130 in the wired or wireless communication method.

The detector 110 made of resistive conductive yarn may be configured to include a conductive fiber and an elastic yarn.

The conductive fiber may be made of a carbon fiber or a metal line, or the like.

The conductive fiber and the elastic yarn of the detector 110 may be formed as a twisted type, a type in which the conductive fiber is rotatably twisted based on the elastic yarn, or a type in which the conductive fiber is rotatably twisted double in an opposite direction based on the elastic yarn.

As the method for connecting the conductive yarn belonging to the detector 110 to the steering apparatus 300, there is a method that fabricates the conductive yarn in an independent pattern type form the steering apparatus 300 and attaches it to the steering apparatus 300 and a method that embeds the conductive yarn in the surface of the steering apparatus 300.

When the conductive yarn of the detector 110 is fabricated in the pattern type independent from the steering apparatus 300 to detect finger contact, it is attached by solids such as plastic made of a flexible material or may be fabricated in a type of a composite pattern or a single pattern in which the resistive conductive yarn is included in the solids.

When the conductive yarn of the detector 110 is fabricated in a type in which it is embedded in the surface of the steering apparatus 300, the resistive conductive yarn is embedded in the steering apparatus 300 together with components for performing the wired and wireless communications and then, the surface layer of the flexible material is covered thereon, thereby manufacturing the steering apparatus 300.

In addition, the detector 110 may be manufactured so that it analyzes the operator's steering apparatus 300 operational patterns and commonly touched locations in which the conductive yarn is embedded.

Further, the detector 110 may be configured to further include a buffer connection wire.

Figure 6:
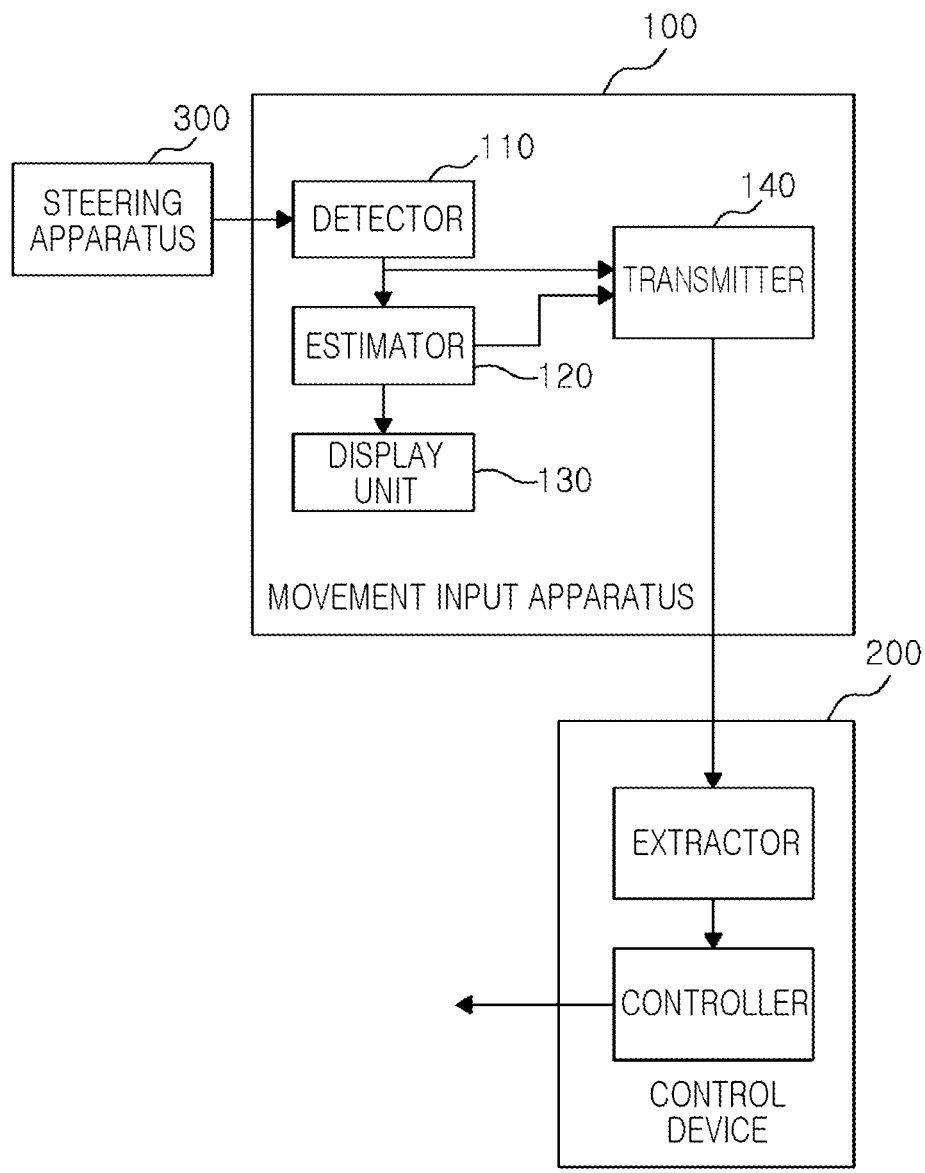
FIG. 6 is a functional block diagram of a mobile control system including the movement input apparatus according to the present invention.

FIG. 6 is a functional block diagram of a mobile control system including the apparatus of movement input according to the present invention.

Referring to FIG. 6, the mobile control system according to the present invention may be configured to include the movement input apparatus 100, the control device 200, and the steering device. The control device 220 may be configured to include an extractor 210 and a controller 220.

The movement input apparatus 100 may be configured to include the detector 110, the estimator 120, and the display unit 130 and may be configured to further include the transmitter 140. The steering device 300 may be generally implemented as a steering wheel, and so on. The movement input apparatus 100 and the steering apparatus 300 is already described and therefore, a detailed description thereof will be omitted.

The control device 200 receives the movement information detected in the movement input apparatus 100 or the estimated information on the movement and status of the operator and outputs the signals capable of controlling a car.

The extractor 210 extracts the information and signals related to the car control from the movement information or the estimated information on the movement and status of the operator that are transmitted from the movement input apparatus 100.

The controller 220 receives information and signals related to car control extracted from the extractor 210 and converts and outputs them into the signals for controlling a car.

In other words, the control device 220 receives information related to the movement of the operator from the movement input apparatus 100 to extract only information directly or indirectly related to car control, thereby realizing effective car control therewith.

Therefore, the car control system of the present invention receives only the operator's finger contact movement to estimate the status of the operator, thereby making it possible to output the warning signals or the signals for controlling a car.

As set forth above, the movement input apparatus applied to the steering apparatus and the mobile control system using the same obtain the information on the movement of the operator through the tactile signals in real time, thereby making it possible to estimate the operator's status. Further, the present invention can output the signals for controlling a car by using the obtained information on the movement and status of the operator.

While the present invention has been shown and described in connection with the exemplary embodiments, it will be apparent to those skilled in the art that modifications and variations can be made without departing from the spirit and scope of the invention as defined by the appended claims.

What is claimed is:

1. A movement input apparatus, comprising:
a detector that is attached or embedded in a surface of a steering apparatus, the detector being configured to detect finger contact movement;
an estimator configured to receive information on the finger contact movement detected by the detector, analyze movement patterns, and estimate a condition of an operator using a result of the analysis of the movement patterns; and
an output unit configured to convert and output the analyzed movement patterns of the operator and the estimated condition of the operator into signals of a type that can be sensed by a user,
wherein the detector includes a resistive conductive yarn,
wherein the detector detects the finger contact movement that exerts a tensile or compressive force on the resistive conductive yarn in a longitudinal direction of the resistive conductive yarn, and
wherein the detector detects the finger contact movement by detecting a resistance value of the resistive conductive yarn and converts the finger contact movement into electric signals, the resistance value varying linearly based on expansion or contraction of a length of the resistive conductive yarn due to the tensile or compressive force exerted in the longitudinal direction of the resistive conductive yarn.

2. The movement input apparatus of claim 1, wherein the output unit is configured to convert the estimated status of the operator into at least one of image signals, voice signals, sound signals, and vibration signals.

3. The movement input apparatus of claim 1, further comprising a transmitter that transmits at least one of the information on the finger contact movement detected in the detector, information on the movement patterns of the operator analyzed in the estimator, and information on the status of the operator estimated in the estimator to external devices.

4. The movement input apparatus of claim 1, wherein the estimator and the output unit are embedded in the steering apparatus.

5. The movement input apparatus of claim 1, wherein the estimator includes:
an input unit configured to filter the movement patterns by using the information on the finger contact movement transmitted from the detector;
a pattern analyzer configured to analyze the movement patterns filtered in the input unit to determine whether the movement patterns of the operator are a normal pattern;
a grip searcher configured to search for a grip of the operator or a grip location of the operator when a change value of the movement patterns filtered in the input unit exceeds a specific value; and
a fatigue analyzer configured to synthesize a determination result of the pattern analyzer and a search result of the grip searcher to estimate a fatigue condition of the operator.

6. The movement input apparatus of claim 5, wherein the estimator further includes a transducer that converts output signals into analog to digital (A/D) signals.

7. A mobile control system, comprising:
a movement input apparatus including a detector that is attached or embedded in a surface of a steering apparatus, the detector being configured to detect finger contact movement, an estimator configured to receive information on the finger contact movement detected by the detector to analyze a movement pattern and estimate a condition of an operator using a result of the analysis of the movement pattern, and an output unit configured to convert the analyzed movement patterns of the operator and the estimated condition of the operator into signals of a type able to be sensed by a user and output the signals; and
a control device including an extractor configured to extract operator operation signals by analyzing at least one of information on the finger contact movement detected by the detector and transmitted from the movement input apparatus, information on operator movement patterns analyzed by the estimator, and information on an operator's condition estimated by the estimator, and a controller configured to generate and transmit control signals for external devices according to the extracted operation signals of the operator,
wherein the detector detects the finger contact movement that exerts a tensile or compressive force on the resistive conductive yarn in a longitudinal direction of the resistive conductive yarn, and
wherein the detector is configured to detect the finger contact movement by detecting a resistance value of a resistive conductive yarn and converts the finger contact movement into electric signals, the resistance value varying linearly based on expansion or contraction of a length of the resistive conductive yarn due to the tensile or compressive force exerted in the longitudinal direction of the resistive conductive yarn.

8. The mobile control system of claim 7, wherein the output unit is configured to convert the estimated condition of the operator into at least one of image signals, voice signals, sound signals, and vibration signals.

9. The mobile control system of claim 7, further comprising a transmitter that transmits at least one of the information on the finger contact movement detected in the detector, the information on the movement patterns of the operator analyzed in the estimator, and the information on the status of the operator estimated in the estimator to the control device or external devices.

10. The mobile control system of claim 7, wherein the estimator and the display unit are embedded in the steering apparatus.

11. The mobile control system of claim 7, wherein the estimator includes:
an input unit configured to filter the movement patterns by using the information on the finger contact movement transmitted from the detector;
a pattern analyzer configured to analyze the movement patterns filtered in the input unit to determine whether the movement patterns of the operator are a normal pattern;
a grip searcher configured to search for a grip of the operator or a grip location of the operator when a change value of the movement patterns filtered in the input unit exceeds a specific value; and a fatigue analyzer configured to synthesize a determination result of the pattern analyzer and a search result of the grip searcher to estimate a fatigue condition of the operator.

12. The mobile control system of claim 11, wherein the estimator further includes a transducer that converts output signals into analog to digital (A/D) signals.

13. The movement input apparatus of claim 1, wherein the detector is attached to the surface of the steering apparatus, and wherein the detector covers the surface of the steering apparatus.

14. The movement apparatus of claim 1, wherein the movement patterns comprise finger contact movement across a surface along a circumference of the steering apparatus, the finger contact movement causing a change in the length of the conductive yarn.

15. The mobile control system of claim 7, wherein the movement patterns comprise finger contact movement across a surface along a circumference the steering apparatus, the finger contact movement causing a change in the length of the conductive yarn.

16. The movement apparatus of claim 1, wherein the resistive conductive yarn includes a first resistive conductive yarn and a second resistive conductive yarn, wherein the first resistive conductive yarn is attached or embedded along a first portion of a circumference of the surface of the steering apparatus and the second resistive conductive yarn is attached or embedded along a second portion of the circumference of the surface of the steering apparatus, an end of the first resistive conductive yarn being disposed adjacent to an end of the second resistive conductive yarn, and wherein a length of the first resistive conductive yarn expands when a length of the second resistive conductive yarn contracts, and the length of the first resistive conductive yarn contracts when the length of the second resistive conductive yarn expands.

\* \* \* \* \*